(12) United States Patent
Lotz et al.

(10) Patent No.: US 9,039,862 B2
(45) Date of Patent: May 26, 2015

(54) BONDING USING HOT-MELT ADHESIVES

(71) Applicant: HENKEL AG & CO. KGAA, Duesseldorf (DE)

(72) Inventors: Juergen Lotz, Kiedrich (DE); Dirk Kasper, Duesseldorf (DE); Lutz Pielert, Erfurt (DE)

(73) Assignee: HENKEL AG & CO. KGAA, Duesseldorf (DE)

( * ) Notice: Subject to any disclaimer, the term of this patent is extended or adjusted under 35 U.S.C. 154(b) by 0 days.

(21) Appl. No.: 13/793,377

(22) Filed: Mar. 11, 2013

(65) Prior Publication Data

US 2013/0186566 A1    Jul. 25, 2013

Related U.S. Application Data

(63) Continuation of application No. PCT/EP2011/066745, filed on Sep. 27, 2011.

(30) Foreign Application Priority Data

Sep. 27, 2010  (DE) .......................... 10 2010 041 463

(51) Int. Cl.
| | | |
|---|---|---|
| *C09J 123/12* | (2006.01) | |
| *B32B 7/12* | (2006.01) | |
| *B32B 29/02* | (2006.01) | |
| *B32B 15/08* | (2006.01) | |
| *C09J 123/14* | (2006.01) | |
| *B32B 29/00* | (2006.01) | |
| *C08L 23/14* | (2006.01) | |
| *C08K 5/134* | (2006.01) | |
| *C08L 91/06* | (2006.01) | |

(52) U.S. Cl.
CPC ............ *C09J 123/12* (2013.01); *C09J 123/142* (2013.01); *B32B 7/12* (2013.01); *B32B 15/08* (2013.01); *B32B 29/002* (2013.01); *Y10T 428/2804* (2015.01); *Y10T 428/2826* (2015.01); *Y10T 428/24843* (2015.01); *Y10T 428/263* (2015.01); *C08L 23/142* (2013.01); *C08L 2205/02* (2013.01); *C08K 5/1345* (2013.01); *C08L 91/06* (2013.01)

(58) Field of Classification Search
CPC ........ C09J 123/12; B32B 7/12; B32B 29/002; B32B 15/08
USPC ................... 524/502, 291; 156/60, 500, 334; 428/344, 349, 334, 200
See application file for complete search history.

(56) References Cited

U.S. PATENT DOCUMENTS

| | | | |
|---|---|---|---|
| 3,798,118 A * | 3/1974 | Jones et al. | ................ 428/484.1 |
| 4,528,312 A | 7/1985 | Edwards | |
| 5,965,657 A | 10/1999 | Voegtli et al. | |
| 7,524,910 B2 | 4/2009 | Jiang et al. | |
| 8,076,422 B2 | 12/2011 | Heemann et al. | |
| 2004/0127614 A1 | 7/2004 | Jiang et al. | |
| 2008/0190541 A1 | 8/2008 | Terfloth et al. | |
| 2009/0156729 A1 * | 6/2009 | Karandinos et al. | .......... 524/502 |
| 2009/0203847 A1 | 8/2009 | Ellis et al. | |
| 2010/0015331 A1 | 1/2010 | Bieser et al. | |
| 2011/0172348 A1 | 7/2011 | Hoya et al. | |
| 2012/0058279 A1 | 3/2012 | Schmid | |

FOREIGN PATENT DOCUMENTS

| | | |
|---|---|---|
| WO | 0146277 A2 | 6/2001 |
| WO | 0162492 A1 | 8/2001 |
| WO | 2006069205 A1 | 6/2006 |

* cited by examiner

*Primary Examiner* — James J Seidleck
*Assistant Examiner* — Deve E Valdez
(74) *Attorney, Agent, or Firm* — Sun Hee Lehmann

(57) ABSTRACT

The invention relates to the use of a hot-melt adhesive having high hardness for adhesive bonding of metal films or foils, paper films or foils, and/or plastic films or foils. The invention further relates to a method for adhesively bonding a metal film or foil, paper film or foil, and/or plastic film or foil onto a substrate.

22 Claims, No Drawings

BONDING USING HOT-MELT ADHESIVES

BACKGROUND OF THE INVENTION

The invention relates to the use of a hot-melt adhesive having a high hardness for the adhesive bonding of metal films or foils, paper films or foils, and/or plastic films or foils, such that the adhesive can be applied in a thin layer. The invention further relates to a method for adhesively bonding a metal film or foil, paper film or foil, and/or plastic film or foil onto a substrate.

The adhesive bonding of films or foils using adhesives is known. It is known, for example, to adhesively bond films or foils onto a variety of workpieces for visual design, or as surface protection. The adhesives are selected in accordance with the different substrates. It is known in this context to utilize reactive adhesives. These result, after they have crosslinked, in good mutual adhesion among the substrates. A disadvantage of such systems, however, is that a certain time is required for final curing, which can have a disadvantageous effect on a subsequent post-processing operation.

It is also known to use aqueous adhesives on, for example, wood substrates. Any possible moisture can be absorbed by the substrate, which can result in an acceleration of the adhesive operation. This property is also disadvantageous, however, since changes in shape and surface cannot be ruled out.

EP 2191947 A1 is also known. This describes a method and an apparatus for coating solid workpieces, the latter being adhesively bonded to a flexible coating material. A thermoplastic adhesive can be applied in this context together with the coating material; it is also possible, however, for a precoated film or foil to be bonded. Bonding occurs as a result of pressure and heating.

WO 2001/062492 A2 is furthermore known. It describes a wood substrate that is adhesively bonded to a decorative layer. Hot-melt adhesives having a high Shore D hardness, which encompass in particular polystyrene-based polymers, are disclosed for bonding.

The aforesaid adhesives for bonding flexible films or foils to planar substrates produce a variety of utilization problems. Reactive adhesives require a longer reaction time in order to build up final adhesion. Physically curing adhesives based on solutions or aqueous systems result in processing problems due to the fact that the solvent can damage the substrate surface, or that hazards in the working environment are a concern with organic solvents.

Known hot-melt adhesives usually have insufficient hardness to generate a solid surface. If the glass transition temperature of the binding agents is increased or if fillers are added, the application temperature then rises. For film or foil bonding, however, it is necessary for an elastic, non-brittle bond to be obtained; in addition, substrates must not be damaged in the course of application. If the adhesive layer is too brittle or is applied too thickly, damage occurs in the composite bond and the heat that is introduced can cause deformation of the substrates.

SUMMARY OF THE INVENTION

The object of the present invention is therefore to furnish a hot-melt adhesive that can be used for the adhesive bonding of metal films or foils, paper films or foils, and/or plastic films or foils; the hot-melt adhesive is intended to exhibit good elasticity and high hardness. The hot-melt adhesive is intended to be applied onto the metal film or foil, paper film or foil, and/or plastic film or foil and to enable rapid bonding, so that immediate post-processing can be achieved.

The object is achieved by the use of a hot-melt adhesive for adhesive bonding of metal films or foils, paper films or foils, and/or plastic films or foils, where the hot-melt adhesive has a Shore D hardness above 50 and contains the following components:

10 to 80 wt % of at least one thermomechanically degraded polypropylene copolymer,
5 to 60 wt % of at least one tackifying resin,
0 to 40 wt % of at least one further additive.

The invention further relates to a metal film or foil, paper film or foil, and/or plastic film or foil that encompasses an adhesive layer of a hot-melt adhesive used according to the present invention, and to a method for adhesively bonding a metal film or foil, paper film or foil, and/or plastic film or foil onto a substrate.

A further subject of the present invention is the hot-melt adhesive itself that is used according to the present invention.

DETAILED DESCRIPTION OF THE INVENTION

In the context of the present invention, the Shore D hardness is determined in accordance with DIN EN ISO 868: 2003, the measurement being carried out by means of a type D durometer using a test specimen having a thickness of at least 1 cm at a temperature of 20° C. The Shore D hardness is preferably read off 15 seconds after the presser foot and test specimen are brought into contact.

"Hot-melt adhesives" are understood for purposes of the present invention as adhesives that are applied as a melt onto the parts to be bonded, and that set while solidifying as they cool.

A "polypropylene copolymer" is understood for purposes of the present invention as copolymers of propylene with other comonomers such as, for example, ethylene and/or $C_4$ to $C_{20}$ alpha-olefins.

A "thermomechanically degraded polypropylene copolymer" is understood for purposes of the present invention as a polymer that, proceeding from a polypropylene copolymer, is manufactured in a suitable apparatus by thermomechanical degradation. The weight-average molecular weight ($M_w$) of the degraded polypropylene copolymer, determined under comparable conditions, is always less than the weight-average molecular weight ($M_w$) of the polypropylene copolymer.

The polypropylene copolymer, i.e. the initial polymer from which the thermomechanically degraded polypropylene copolymer of the present invention is manufactured by thermomechanical degradation, is also referred to in the context of the present invention as a "higher-molecular-weight undegraded polypropylene copolymer."

The term "thermomechanical degradation" is understood for purposes of the present invention as a polymer-chain-shortening and molecular-weight-reducing breakdown process that is carried out in a suitable apparatus, for example an extruder, under shear stress and with the application of heat.

It is particularly advantageous in the context of the present invention if the thermomechanical degradation is carried out in such a way that no further reactive compounds, such as e.g. olefinically unsaturated monomers, are present in the context of the aforesaid degradation.

The hot-melt adhesive used in the present invention is notable in particular for its high Shore D hardness above 50, and thus permits the manufacture of scratch-proof film- or foil-coated substrates, for example wood, metal, or plastic shaped elements. The adhesive layer of hot-melt adhesive present on the coated films or foils is not tacky at 20° C., so that the films or foils can be stored easily without adhering to one another. In addition, the aforesaid adhesive layer of hot-melt adhesive is easily heat-activatable, so that with the simultaneous application of pressure and temperature, simple and—because of the short open time of the hot-melt adhesive—also rapid bonding of the above-described films or foils is achieved. The hot-melt adhesives used in the present invention further exhibit high levels of elasticity and thermal stability, so that the adhesive bonds that are formed remain stable even in mechanically and/or thermally demanding conditions.

The hot-melt adhesive used according to the present invention contains at least one copolymer based on propylene, at least one tackifying resin, and optionally at least one further additive.

Suitable thermomechanically degraded polypropylene copolymers can be manufactured from commercially usual higher-molecular-weight undegraded polypropylene copolymers by means of a thermomechanical degradation process that is carried out by preference in an extruder at temperatures of more than 150° C.

The hot-melt adhesive used according to the present invention encompasses, based on the total quantity of hot-melt adhesive, 10 to 80 wt %, by preference 20 to 70 wt %, and particularly preferably 30 to 60 wt % of at least one thermomechanically degraded polypropylene copolymer.

The hot-melt adhesive used according to the present invention can of course also contain mixtures of different thermomechanically degraded polypropylene copolymers, mixtures of two different thermomechanically degraded polypropylene copolymers being particularly preferred.

The thermomechanically degraded polypropylene copolymer used in the present invention is a polyolefin copolymer that in polymerized form contains, besides propylene, at least one further comonomer that is selected by preference from ethylene and/or $C_4$ to $C_{20}$ alpha-olefins. Preferred $C_4$ to $C_{20}$ alpha-olefins are, in particular, aliphatic $C_4$ to $C_{20}$ alpha-olefins that do not encompass any aromatic groups, for example butene, pentene, hexene, heptene, octene, nonene, decene, dodecene, 4-methyl-1-pentene, 3,5,5,-trimethyl-1-hexane, and 5-ethyl-1-nonene. In an embodiment of the invention, terpolymers based on propylene, ethylene, and $C_4$ to $C_{20}$ alpha-olefins are used as a degraded polypropylene copolymer.

The propylene proportion in the thermomechanically degraded polypropylene copolymer of the present invention is by preference between 50 and 99 wt %, in particular between 60 and 97 wt %, and particularly preferably between 65 and 95 wt %, based in each case on the total weight of the thermomechanically degraded polypropylene copolymer. Thermomechanically degraded polypropylene copolymers that comprise the aforementioned weight proportions of propylene can be obtained in particularly effective fashion from the corresponding higher-molecular-weight undegraded polypropylene copolymers by thermomechanical degradation with a high degree of molecular-weight reduction and viscosity decrease.

If present, the ethylene content in the thermomechanically degraded polypropylene copolymer of the present invention is by preference between 1 and 25 wt % and particularly preferably between 2 and 20 wt %, based in each case on the total weight of the thermomechanically degraded polypropylene copolymer. Thermomechanically degraded polypropylene copolymers that comprise the aforementioned weight proportions of ethylene can likewise be obtained in particularly effective fashion from the corresponding higher-molecular-weight undegraded polypropylene copolymers by thermomechanical degradation with a high degree of molecular-weight reduction and viscosity decrease.

The weight-average molecular weight ($M_w$) of the thermomechanically degraded polypropylene copolymer of the present invention is by preference 1000 g/mol to 200,000 g/mol, particularly preferably 10,000 g/mol to 150,000 g/mol, and very particularly preferably 20,000 g/mol to 100,000 g/mol.

In the context of the present invention, the weight-average molecular weight ($M_w$) is determined by gel permeation chromatography (GPC) utilizing a polystyrene standard.

The aforementioned thermomechanically degraded polypropylene copolymer is obtained by thermomechanical degradation of a higher-molecular-weight undegraded polypropylene copolymer, the latter polymer having by preference a weight-average molecular weight ($M_w$) from 100,000 g/mol to 3,000,000 g/mol, particularly preferably 150,000 g/mol to 1,000,000 g/mol, and very particularly preferably 200,000 g/mol to 800,000 g/mol.

The use of high-molecular-weight undegraded polypropylene copolymers having a weight-average molecular weight of at least 100,000 g/mol, by preference at least 150,000 g/mol, and in particular at least 200,000 g/mol is advantageous because the aforesaid polymers can be manufactured economically, and can be broken down effectively into the thermomechanically degraded polypropylene copolymers of the present invention.

The weight-average molecular weight ($M_w$) of the thermomechanically degraded polypropylene copolymer is by preference less than 70%, particularly preferably less than 60%, very particularly preferably less than 50%, and greatly preferably less than 40% of the weight-average molecular weight ($M_w$), determined under identical conditions, of the higher-molecular-weight undegraded polypropylene copolymer. The "weight-average molecular weight ($M_w$)" of the higher-molecular-weight undegraded polypropylene copolymers is understood here as its initial molecular weight, i.e. the weight-average molecular weight ($M_w$) of the aforesaid polymer before thermomechanical degradation is carried out.

In a further embodiment, the thermomechanically degraded polypropylene copolymer of the present invention is manufactured by thermomechanical degradation of at least one undegraded higher-molecular-weight polypropylene copolymer under shear stress above the softening point of the undegraded higher-molecular-weight polypropylene copolymer, the melt viscosity of the thermomechanically degraded polypropylene copolymer, determined at 200° C., being less than 70%, very particularly preferably less than 50 wt %, greatly preferably less than 40% of the melt viscosity of the undegraded higher-molecular-weight polypropylene copolymer, likewise determined at 200° C.

The "melt viscosity" of the undegraded higher-molecular-weight polypropylene copolymer is understood in this context as its initial melt viscosity, i.e. the melt viscosity of the undegraded higher-molecular-weight polypropylene copolymer, determined at 200° C., before thermomechanical degradation is carried out.

In the context of the present invention, the melt viscosity is determined at 200° C., by preference using a Brookfield Thermosel RVT viscosimeter (obtainable from Brookfield Engineering Laboratories, Inc., Stoughton, Mass., USA). For viscosities up to 100,000 mP·s a number 27 spindle is used, while a number 29 spindle is used for melt viscosities greater than 100,000 mPa·s. The rotational speed of the respective spindle is adjusted so that at a temperature of 200° C., the torque values of the viscosimeter are in a range from 10 to 95%, by preference at 50%, of the maximum permissible torque.

The "softening point" is determined in the context of the present invention using the "ring and ball" method in accordance with ASTM E-28, an HRB 754 ring and ball machine of Walter Herzog GmbH preferably being used.

The melt viscosity of the thermomechanically degraded polypropylene copolymer of the present invention, determined at 200° C., is by preference 100 mPa·s to 200,000 mPa·s, particularly preferably 1000 mPa·s to 100,000 mPa·s, greatly preferably 2000 mPa·s to 80,000 mPa·s, and very particularly preferably 6000 mPa·s to 60,000 mPa·s.

The thermomechanically degraded polypropylene copolymers of the present invention are obtained by preference from undegraded higher-molecular-weight polypropylene copolymers, the latter polymers having by preference a melt viscosity of at least 300,000 mPa·s determined at 200° C. In particular, the melt viscosity of the respective undegraded higher-molecular-weight polypropylene copolymers, determined at 200° C., is between 350,000 mPa·s and 20,000,000 mPa·s, by preference between 400,000 mPa·s and 10,000,000 mPa·s, and particularly preferably between 450,000 mPa·s and 5,000,000 mPa·s.

As a result of the thermomechanical degradation of the polypropylene copolymer, the thermomechanically degraded polypropylene copolymers of the present invention comprise by preference at least $0.5 \cdot 10^{-5}$ mol, particularly preferably at least $2.0 \cdot 10^{-5}$ mol, and greatly preferably at least $5.0 \cdot 10^{-5}$ mol functional groups per gram of polymer, the functional groups being selected in particular from oxygen-comprising functional groups such as e.g. OH, lactone, acetyl-ester, aldehyde, ketone, and carboxylic-acid groups, and from vinylidene groups. Thermomechanically degraded polypropylene copolymers that comprise the aforesaid concentration of functional groups exhibit, in particular, good substrate adhesion.

The concentration of functional groups in the thermomechanically degraded polypropylene copolymer of the present invention can easily be determined by one skilled in the art using common spectroscopic methods, for example NMR spectroscopy and/or IR spectroscopy.

The thermomechanically degraded polypropylene copolymers of the present invention can be manufactured particularly effectively if the thermomechanical degradation of the polymers is carried out in the presence of at least one radical former.

A "radical former" is understood for purposes of the present invention as a substance that decomposes into radicals as a result of external action, for example heat and/or radiation.

Suitable radical formers are principally compounds containing peroxo or diazo groups; peroxides, such as e.g. organic peroxides, are preferred because of their good commercial availability and ease of handling. Advantageous radical formers can be selected, for example, from the following products resp. compounds and/or from any mixtures thereof: TRIGONOX 101® (2,5-dimethyl-2,5-di-[tert-butylperoxyl] hexane), TRIGONOX 301® (3,6,9-triethyl-3,6,9-trimethyl-1,4,7-triperoxonane), both commercially obtainable from AKZO, di-tert-amyl peroxide, commercially obtainable from CK Witco as DTAP® and from AKZO as TRIGONOX 201®, dicumyl peroxide, di-tert-butyl peroxide, 2,5-dimethyl-2,5-di(tert-butylperoxy)-3-hexine, 1,3-bis(tert-butylperoxyisopropyl) phenyl, 1,1-bis(tert-butylperoxy)-3,3,5-trimethylcyclohexane, n-butyl-4,4-bis(tert-butylperoxy) valerate, benzoyl peroxide, p-chlorobenzoyl peroxide, 2,4-dichlorobenzoyl peroxide, tert-butyl peroxybenzoate, tert-butylperoxy isopropyl carbonate, diacetyl peroxide, lauroyl peroxide, tert-butyl cumyl peroxide, tert-butyl peroxy-2-ethylhexanoate.

Preferred peroxides have a half-life, determined in monochlorobenzene at 150° C., from 0.01 h to 10 h, by preference from 0.1 to 5 h, and particularly preferably from 0.3 h to 3 h.

It is particularly advantageous for manufacture of the thermomechanically degraded polypropylene copolymers if, in the context of thermomechanical degradation of the undegraded higher-molecular-weight polypropylene copolymer, the radical former is added in a quantity of 0.01 and 5 wt %, by preference in a quantity from 0.02 to 2 wt %, and in particular in a quantity of 0.1 and 1.5 wt %, based in each case on the total quantity of the undegraded higher-molecular-weight polypropylene copolymer.

The radical former added is by preference a peroxide, in a quantity of 0.01 and 3 wt %, by preference from 0.1 to 2 wt %, and in particular of 0.2 and 1.5 wt %, based in each case on the total quantity of higher-molecular-weight undegraded polypropylene copolymer.

Thanks to the above-described quantity of radical former resp. peroxide, the thermomechanical degradation process can be carried out at a temperature from 100° C. to 350° C., by preference from 120° C. to 320° C., and particularly preferably from 140° C. to 300° C.

A suitable apparatus for carrying out the thermal degradation is by preference an extruder. The term "extruder" can be understood for purposes of the present invention as both single-screw and double-screw extruders. The latter are technically more complex and are offered in a variety of configurations. A distinction is made here in particular between co-rotating or counter-rotating, closely intermeshing or tangential, longitudinally resp. transversely open or closed, and cylindrical or conical configurations. Compounders, expansion extruders, ring extruders, or planetary roller extruders can also be used.

An extruder being used can encompass a housing, having a feed side and a discharge side, in which at least one screw can be rotatably mounted, having a, for example, helically extending land protruding from its screw core. The housing can comprise on the fee side at least one feed opening for the undegraded higher-molecular-weight polypropylene copolymers to be processed in the extruder, as well as optionally one or more loading openings for additives, additional substances and/or adjuvants, through which the in particular at least one radical former, such as e.g. a peroxide, is fed. Under shear stress and in particular with the application of heat, the thermomechanically degraded polypropylene copolymer can then be manufactured from a corresponding undegraded higher-molecular-weight polypropylene copolymer above its softening point in the extruder, by preference in the presence of peroxides.

The softening point of the thermomechanically degraded polypropylene copolymer of the present invention is by preference between 80° C. and 170° C., particularly preferably between 100° C. and 160° C., and greatly preferably between 120° C. and 150° C., with the result that the hot-melt adhesives of the present invention exhibit a high level of thermal stability, and thus ensure stable adhesive bonding even under thermally demanding conditions.

Thermomechanical degradation of the polypropylene copolymers yields low-viscosity polymers with particular crystallinity, which impart to the adhesives used according to the present invention not only particularly easy processability but also, simultaneously, a Shore D hardness above 50.

In order to enable particularly strong surface bonding, it is particularly advantageous if the adhesive used according to the present invention has a Shore D hardness above 51, particularly preferably above 53, and very particularly preferably above 54.

The thermomechanically degraded polypropylene copolymers of the present invention by preference have a glass transition temperature (Tg) below 0° C., particularly preferably below −10° C., the glass transition temperature being, in particular, above −40° C.

The glass transition temperature (Tg) is determined in the context of the present invention in known fashion by differential scanning calorimetry (DSC), preferably using a TA Instruments DSC Q2000.

Particularly advantageous hot-melt adhesives usable according to the present invention, which are notable for a very high Shore D hardness, particularly good processability in combination, with high elasticity and thermal stability, are obtained for purposes of the present invention if the adhesive used according to the present invention encompasses at least two different thermomechanically degraded polypropylene copolymers, at least one thermomechanically degraded polypropylene copolymer having an enthalpy of fusion from 1 J/g to 50 J/g, and at least one further thermomechanically degraded polypropylene copolymer having an enthalpy of fusion from 55 J/g to 120 J/g.

The enthalpy of fusion is determined in the context of the present invention by differential scanning calorimetry (DSC) per DIN EN ISO 11357-3.

Combinations of at least two different thermomechanically degraded polypropylene copolymers, in which
at least one thermomechanically degraded polypropylene copolymer has an enthalpy of fusion from 5 J/g to 40 J/g, particularly preferably from 8 J/g to 30 J/g, and/or
at least one further thermomechanically degraded polypropylene copolymer has an enthalpy of fusion from 60 J/g to 100 J/g, particularly preferably from 62 J/g to 90 J/g, are particularly preferred.

As a further constituent, the hot-melt adhesive used according to the present invention contains at least one tackifying resin. The resin produces additional tackiness, and can also improve adhesion. These are, in particular, resins that have a softening point from 60 to 140° C. These are, for example, aromatic, aliphatic, or cycloaliphatic hydrocarbon resins, as well as modified or hydrogenated derivatives. Further resins usable in the context of the invention are, for example, polyterpene resins, phenolically or aromatically modified polyterpene resins, modified natural resins, such as resin acids from balsam resin, tall resin, or wood rosin, optionally also hydroabietyl alcohol and esters thereof, acrylic acid copolymerizates, such as styrene-acrylic acid copolymers, and resins based on functional hydrocarbon resins. Hydrocarbon resins are particularly suitable. Such resins are commercially available. They are used in a quantity from 5 to 60 wt %, preferably from 10 to 50 wt %, based in each case on the total quantity of the hot-melt adhesive usable according to the present invention.

The hot-melt adhesive usable according to the present invention can also, besides the constituents recited above, contain as additives further constituents usually utilized in hot-melt adhesives. These include, for example, plasticizers, stabilizers, waxes, adhesion promoters, fillers, such as e.g. pigments, and/or antioxidants. Specific applications-engineering properties such as e.g. cohesive strength, viscosity, softening point can thereby be influenced. Fillers can furthermore be used to increase strength and optionally for cost reduction.

In addition to the constituents mentioned above, the hot-melt adhesive usable according to the present invention can optionally also contain further elastic thermoplastic polymers. These polymers can improve a variety of applications-engineering properties of the hot-melt adhesive, e.g. cohesion, thermal stability, low-temperature flexibility. Such elastic polymers are to be understood, in particular, as styrene block copolymers, which can have elastic or rubber-elastic properties. They can be two-block or three-block copolymers that can comprise at least one styrene block. Examples thereof are SBR, SAN, styrene-isoprene copolymers (SIS), styrene-ethylene/butylene copolymers (SEBS), styrene-ethylene/propylene copolymers (SEPS), styrene-isoprene-butylene copolymers (SIBS), styrene-butadiene copolymers (SBS), hydrogenated styrene-butylene-butadiene copolymers (SBBS). Block copolymers of this kind are known to one skilled in the art and are commercially obtainable. Further examples are polybutene or copolymers thereof, polymethyl vinyl ethers and similar polymers, as well as polyphenylene oxide and modifications thereof. These additional polymers are intended to be solid at room temperature (22° C.), and to be miscible homogeneously with the hot-melt adhesive usable according to the present invention. A microphase structure is not ruled out in this context. The further polymers can optionally be functionalized, for example by grafting. Dicarboxylic acids and anhydrides thereof represent, for example, a preferred grafting agent.

The polymers are to be selected by one skilled in the art in such a way that good compatibility with the other constituents of the hot-melt adhesive usable according to the present invention is produced. The quantity of the copolymers can be equal to 0.1 to 20 wt %, based in each case on the total quantity of the hot-melt adhesive usable according to the present invention; in particular, 0.5 to 10 wt % of at least one thermoplastic elastomer can be contained.

The hot-melt adhesive usable according to the present invention can optionally have waxes added to it in quantities from 0 to 30 wt %, preferably in quantities from 5 to 20 wt %, based in each case on the total quantity of the hot-melt adhesive. The quantity is adjusted so that on the one hand the viscosity is lowered into the desired range, but on the other hand adhesion is not negatively influenced. The wax can be of natural origin, optionally also in chemically modified form, or of synthetic origin. Vegetable waxes and animal waxes can be used as natural waxes, also mineral waxes or petrochemical waxes. Hard waxes such as montan ester waxes, Sasol waxes, etc. can be used as chemically modified waxes. As synthetic waxes, polyalkylene waxes as well as polyethylene glycol waxes are utilized. Petrochemical waxes such as petrolatum, paraffin waxes, microcrystalline waxes, and synthetic waxes are used by preference.

Plasticizers are used by preference to adjust viscosity or flexibility, and are contained in the hot-melt adhesive usable according to the present invention generally in a quantity from 0 to 20 wt %, by preference in a quantity from 0.1 to 10 wt %, based in each case on the total quantity of the hot-melt adhesive. Suitable plasticizers are medicinal white mineral oils, naphthenic mineral oils, polypropylene or polybutylene or polyisoprene oligomers, hydrogenated polyisoprene and/or polybutadiene oligomers, benzoate esters, phthalates, adipates, vegetable or animal oils and derivatives thereof. Hydrogenated plasticizers are selected, for example, from the group of the paraffinic hydrocarbon oils. Polypropylene glycol and polybutylene glycol, as well as polymethylene glycol, are also suitable. Esters are also optionally used as plasticizers, for example liquid polyesters and glycerol esters, or plasticizers based on aromatic dicarboxylic acid esters.

The purpose of stabilizers is to protect the hot-melt adhesive from decomposition during manufacture and processing, and subsequently when used accordingly. The antioxidants, or also light protection agents, are worth mentioning here in particular. They are added to the hot-melt adhesive usually in quantities of up to 3 wt %, by preference in quantities from approximately 0.1 to 1.0 wt %, based in each case on the total quantity of the hot-melt adhesive. Included among the suitable stabilizers are, by preference, hindered phenols and/or multifunctional phenols, such as e.g. sulfur- and/or phosphorus-containing phenols. "Hindered phenols" are to be understood in particular as compounds in which at least one sterically demanding group, such as e.g. a tert-butyl group, is linked to the phenol, the sterically demanding group being located in particular in the ortho- and/or para-position with respect to the phenolic OH group.

The hot-melt adhesive usable according to the present invention can furthermore contain adhesion promoters. Adhesion promoters are substances that improve adhesion of the hot-melt adhesive to the substrate that is to be bonded. Adhesion promoters are intended in particular to improve the aging behavior of adhesive bonds under the influence of a moist atmosphere. Typical adhesion promoters are, for example, ethylene-acrylamide comonomers, polymeric isocyanates, reactive organosilicon compounds, or phosphorus derivatives with maleic acid anhydride-modified polymers as well as polyacrylates. The wetting properties of the adhesive on the substrates can also be influenced.

The additives, such as plasticizers, stabilizers, or adhesion promoters, are known to one skilled in the art. They are commercial products, and one skilled in the art can select them in accordance with the desired properties. Care must taken in this regard that compatibility with the polymer mixture exists. Mixtures of different plasticizers, mixtures of different stabilizers, and/or mixtures of different adhesion promoters can of course be used in the context of the present inventions.

The hot-melt adhesives suitable according to the present invention have a melt viscosity that is coordinated with the type of application. The hot-melt adhesives recited have a melt viscosity (200° C.) by preference from 100 mPa·s to 200,000 mPa·s, particularly preferably from 1000 mP·s to 100,000 mPa·s, and in particular from 3000 mPa·s to 15,000 mPa·s for bonding large areas, or from 10,000 to 40,000 mPa·s for bonding narrower areas and edges.

The melt viscosity can be determined as described above.

Hot-melt adhesives suitable according to the present invention moreover have by preference a thermal stability of at least 100° C., particularly preferably at least 110° C., and greatly preferably at least 115° C., the thermal stability being determined as follows:

Two sheets of silicone paper are equipped with 15 g of hot-melt adhesive, and are pressed against one another in a model 200E laboratory platen press (Dr. Collin GmbH) at 20 bar for 6 sec using two spacers 0.2 mm in thickness. Ten 2 cm×2 cm test squares are cut out from the pressed film arrangement, in which a hot-melt adhesive layer is located between the two sheets of silicone paper. After removal of the silicone film on one side of the test square, the latter is pressed onto a test specimen part A (100 mm×20 mm×1.5 mm, laminated beech wood) pretreated for 30 min at 50° C. After removal of the second silicone film, test specimen part A is heated in a convention oven for 1 min to 200° C., thereby activating the hot-melt adhesive present on the test specimen. A test specimen part B (100 mm×20 mm×3.0 mm, laminated beech wood), pretreated for 1 min at 200° C., is then set directly perpendicularly onto test specimen part A (into the activated hot-melt adhesive) and pressed with a 4-kg weight until the activated hot-melt adhesive has cooled (approx. 5 min), producing a T-shaped test specimen made up of test specimen parts A and B.

Ten of these T-shaped test specimens at a time are suspended vertically and loaded with a 400-g weight. The temperature is then repeatedly elevated, after an hour in each case, in 5° C. steps. When at least 7 of the ten T-shaped test specimens fall apart at a temperature within one hour, that temperature minus 5° C. is indicated as the thermal stability.

The hot-melt adhesives usable according to the present invention can be manufactured using known methods. It is possible to melt the initial materials and then mix them in known stirring apparatuses. One skilled in the art can easily ascertain a suitable sequence for adding the individual constituents. Another preferred embodiment mixes the constituents in an extruder; in general, the less-easily meltable polymer constituents are added first, and the further additives are put into these mixed constituents as processing in the extruder continues.

A preferred hot-melt adhesive usable according to the present invention has a Shore D hardness above 50, and encompasses in particular the following components:
  30 to 60 wt % of at least one thermomechanically degraded polypropylene copolymer,
  10 to 50 wt % of at least one tackifying resin,
  0 to 20 wt % of at least one further additive.

Another preferred hot-melt adhesive usable according to the present invention has a Shore D hardness above 51, and encompasses in particular the following components:
  30 to 60 wt % of at least one thermomechanically degraded polypropylene copolymer,
  10 to 50 wt % of at least one tackifying resin,
  0.1 to 20 wt % of at least one further additive.

A further preferred hot-melt adhesive usable according to the present invention has a Shore D hardness above 60, and encompasses in particular the following components:
  30 to 60 wt % of at least one thermomechanically degraded polypropylene copolymer,
  10 to 50 wt % of at least one tackifying resin,
  0.1 to 20 wt % of at least one further additive.

In order to optimize mechanical properties and application properties, the hot-melt adhesive used according to the present invention can furthermore contain one or more fillers as an additive. Suitable fillers are inorganic and organic fillers, for example natural ground or precipitated calcium carbonates, barite ($BaSO_4$ or barium sulfate), calcinated kaolins, silicic acids, in particular highly dispersed silicic acids from pyrolysis processes, carbon blacks, in particular industrially manufactured carbon blacks, PVC powders, or hollow spheres, as well as flame-retardant fillers such as hydrates or hydroxides, in particular aluminum hydroxide and aluminum oxide trihydrate. Preferred fillers are calcium carbonates, carbon blacks, and calcinated kaolins.

Because of the particular properties of the thermomechanically degraded polypropylene copolymers, it is possible for the hot-melt adhesive usable according to the present invention to comprise only small proportions of fillers, or to be substantially free or entirely free of fillers, with no substantial deterioration in the mechanical properties and application properties of the hot-melt adhesive.

"Substantially free of fillers" is understood for purposes of the invention to mean that the hot-melt adhesive contains less than 10 wt %, by preference less than 5 wt %, particularly preferably less than 1 wt %, and greatly preferably less than 0.1 wt % pigments and/or fillers.

A further subject of the present invention is a metal film or foil, paper film or foil, and/or plastic film or foil that encompasses at least one adhesive layer of a hot-melt adhesive usable according to the present invention. The (preferred) embodiments of the hot-melt adhesive disclosed above in the context of the use of the hot-melt adhesive also apply analogously to the metal film or foil, paper film or foil, and/or plastic film or foil as a further subject of the present invention.

Preferred metal films or foils, paper films or foils, and/or plastic films or foils of the present invention encompass at least one adhesive layer of a hot-melt adhesive usable according to the present invention, the aforesaid hot-melt adhesive encompassing a combination of at least two different thermomechanically degraded polypropylene copolymers, where

- at least one thermomechanically degraded polypropylene copolymer has an enthalpy of fusion from 5 J/g to 40 J/g, particularly preferably from 8 J/g to 30 J/g, and/or
- at least one further thermomechanically degraded polypropylene copolymer has an enthalpy of fusion from 60 J/g to 100 J/g, particularly preferably from 62 J/g to 90 J/g.

Metal films or foils, paper films or foils, and/or plastic films or foils suitable for purposes of the present invention are by preference web-shaped flexible films or foils that can be adhesively bonded to further, generally solid, planar substrates. These can be single-layer or multi-layer films or foils. They can likewise be imprinted or lacquered on one side. Such films or foils are used for example as decorative films or foils, so-called finish films or foils, in the furniture industry for the lamination of shaped parts made of solid wood, plastic, or metal. Particularly preferred for purposes of the present invention are paper films or foils and/or plastic films or foils that encompass at least one adhesive layer of a hot-melt adhesive usable according to the present invention.

According to the present invention, the metal films or foils, paper films or foils, and/or plastic films or foils can have on one side a layer of a hot-melt adhesive usable according to the present invention. The adhesive layer can be applied using known methods, for example by blading, casting, wide slot nozzles, rolling, or similar methods.

In an embodiment of the invention, the metal film or foil, paper film or foil, and/or plastic film or foil comprises a layer of the hot-melt adhesive usable according to the present invention having a thickness from 10 μm to 100 μm, the aforesaid metal film or foil being coated in particular on one side.

The coated metal film or foil, paper film or foil, and/or plastic film or foil of the present invention is preferably shelf-stable, i.e. a corresponding film or foil can be stored with no loss of subsequent bonding properties. It is converted into a suitable form, for example, by being rolled up. It is necessary for this that the layer of the hot-melt adhesive usable according to the present invention present on said film or foil be block-resistant.

"Block-resistant" is understood for purposes of the present invention to mean that the surface of the adhesive layer does not adhesively bond to a further uncoated side of the metal film or foil, paper film or foil, and/or plastic film or foil under storage conditions.

The aforesaid film or foil can be separated from the surface prior to use by gently pulling, without contaminating resp. damaging the uncoated side of the metal film or foil, paper film or foil, and/or plastic film or foil.

As a test for determining block resistance, single-side-coated plastic PVC films (50 μm thick) are equipped with a layer of a hot-melt adhesive according to the present invention (30 μm) and cooled to 25° C. A stack of ten coated plastic films (10×10 cm) is formed, each coated surface being oriented toward an uncoated film side. This stack is loaded with a planar 1-kg weight. After 24 hours at 25° C. the weight is removed. "Block-resistance" is understood to exist if the films can be separated from one another by pulling gently with a force of 2 N.

The metal films or foils, paper films or foils, and/or plastic films or foils according to the present invention can be post-processed after storage, their coated side being adhesively bonded to a further substrate, for example a surface of a shaped element made of wood. The adhesive layer is, in this context, activated by heating the metal film or foil, paper film or foil, and/or plastic film or foil of the present invention. Adhesive bonding can occur under pressure in this activated state.

A further subject of the present invention is a method for adhesively bonding a metal film or foil, paper film or foil, and/or plastic film or foil onto a substrate, encompassing the steps of:

a) applying a hot-melt adhesive usable according to the present invention onto a metal film or foil, paper film or foil, and/or plastic film or foil so that a film or foil coated on one side with a hot-melt adhesive is produced;

b) bringing together the coated film or foil side and a substrate, and then bonding the coated films or foils to the substrate, the bonding being carried out with simultaneous application of pressure and temperature.

The (preferred) embodiments of the hot-melt adhesive disclosed above in the context of the use of the hot-melt adhesive also apply analogously to the above-described method as a further subject of the present invention.

In a preferred embodiment of the method according to the present invention, a hot-melt adhesive usable according to the present invention that encompasses a combination of at least two different thermomechanically degraded polypropylene copolymers is applied in step a), where

- at least one thermomechanically degraded polypropylene copolymer has an enthalpy of fusion from 5 J/g to 40 J/g, particularly preferably from 8 J/g to 30 J/g, and/or
- at least one further thermomechanically degraded polypropylene copolymer has an enthalpy of fusion from 60 J/g to 100 J/g, particularly preferably from 62 J/g to 90 J/g.

The action of bringing together in step b) of the method according to the present invention can occur, for example, by rolling, slider shoes, shaped tools, or by pressing. Adhesive bonding methods of this kind are known in principle. An apparatus for carrying out the method according to the present invention is known, for example, from EP 2191947 A1.

It is necessary according to the present invention that the hot-melt adhesive usable according to the present invention be applied onto the surface of the metal film or foil, paper film or foil, and/or plastic film or foil. The application is carried out usually at elevated temperatures, for example at temperatures above 150° C. The hot-melt adhesive melts at the aforesaid temperatures, and can be applied onto the metal film or foil, paper film or foil, and/or plastic film or foil using known apparatuses. According to the present method, it is particularly advantageous that the hot-melt adhesive usable according to the present invention is applied at a layer thickness from 10 μm to 100 μm, in particular from 15 to 70 μm.

The metal film or foil, paper film or foil, and/or plastic film or foil thereby coated is then adhesively bonded to the substrate. A storage time can also exist between application of the adhesive and bonding. Because a hot-melt adhesive suitable according to the present invention preferably has a non-bonding surface at 25° C., it is advantageous in particular that the adhesive layer is heated immediately before the adhesive bonding step. This can be carried out, for example, by heating with hot air, with radiative heat such as e.g. IR radiation, or by heating with a heated roller. Heating preferably occurs from the non-coated side of the metal film or foil, paper film or foil, and/or plastic film or foil.

In a further embodiment of the invention, the hot-melt adhesive usable according to the present invention is applied, above its softening point, onto the film or foil surface immediately before the metal film or foil, paper film or foil, and/or plastic film or foil is brought together with the substrate. Because the hot-melt adhesive usable according to the present invention exhibits, in particular, only a short open time, it is advantageous in this embodiment as well that the hot-melt adhesive layer is heated immediately before, and/or in the context of, being brought together.

Adhesive bonding of the coated metal film or foil, paper film or foil, and/or plastic film or foil to the substrate is carried out, as described above, with simultaneous application of pressure and temperature.

"Simultaneous application of pressure and temperature" is understood in the context of the present application to mean that a pressure of at least 1.5 bar is exerted onto the coated metal film or foil, paper film or foil, and/or plastic film or foil at at least 60° C.

In particular, the coated film or foil side of the metal film or foil, paper film or foil, and/or plastic film or foil is heated to temperatures from 100° C. to 200° C., particularly preferably to temperatures from 120° C. to 150° C. Care must be taken that the heating temperature is selected so that the coated metal film or foil, paper film or foil, and/or plastic film or foil, and/or the substrate, are not damaged by the temperature. It is particularly useful to heat the adhesive layer to a temperature that corresponds approximately to the region of the softening point of the hot-melt adhesive usable according to the present invention, or is above the softening point.

In a particular embodiment of the method according to the present invention, the coated film or foil side of the metal film or foil, paper film or foil, and/or plastic film or foil can also be heated to temperatures between 5° C. below the softening point and 30° C. above the softening point of the hot-melt adhesive of the present invention.

Thanks to the use of a thin metal film or foil, paper film or foil, and/or plastic film or foil having a layer thickness of less than 150 μm, which is coated with a thin layer of the hot-melt adhesive usable according to the present invention of less than 100 μm, rapid heating of the hot-melt adhesive layer can be achieved. It is thus possible for heating to be carried out directly before, or while, the coated metal film or foil, paper film or foil, and/or plastic film or foil and the substrate are brought together.

An advantage of the procedure according to the present invention is the fact that a hot-melt adhesive in accordance with the present invention is selected. This exhibits a low viscosity at application temperature, and can be applied in thin layer thicknesses onto the metal film or foil, paper film or foil, and/or plastic film or foil. In addition, the hot-melt adhesive usable according to the present invention is notable for a rapid buildup of adhesion upon cooling. This ensures that the hot-melt adhesive layer cools off immediately after heating ends and that adhesion builds up immediately thereafter, so that rapid post-processing is possible.

The substrates used in the method according to the present invention are, in particular, planar substrates, which are selected by preference from shaped elements made of wood, metal, or plastic, such as e.g. wood components for the furniture industry.

EXAMPLES

0. Measurement Methods

The Shore D hardness values, enthalpies of fusion, melt viscosities, and thermal stability values indicated in the Examples were determined in accordance with the methods described above.

The adhesion properties of the hot-melt adhesives were determined as follows:

a) Producing the Test Specimens

The respective hot-melt adhesive was melted at 200° C. and applied by means of a trough blade (manufacturer: Erichsen Co.) at a film thickness of 40 μm onto a decorative finish film (manufacturer: Dai Nippon, film weight 40 g/m$^2$). The decorative finish film precoated in this manner was reactivated using a 200E laboratory platen press (manufacturer: Dr. Collin GmbH) and bonded onto a 10 cm×20 cm particleboard panel (19 mm thick) at a platen temperature of 135° C. and an adjusted pressing pressure of 20 bar for a pressing time of 2 seconds. The test specimens obtained were then stored at 23° C. at a relative humidity of 65% for at least 24 hours.

b) Adhesion Testing:

The test specimens were immobilized, and a suitable knife was then used to cut into the center of the adhesive join, so that a cut extending parallel to the surface of the particle-board panel was produced. The knife, still located in the adhesive join, was then lifted uniformly, and the adhesive break was evaluated according to the following scale, a score of 1 denoting the best adhesion and a score of 5 the worst adhesion:

Score 1-2: Complete pull-out from panel, and/or very high adhesive bond strength;

Score 2: Film wetted over entire surface (cohesive fracture) and/or definite pull-out from the panel;

Score 2-3: Film wetted over entire surface (cohesive fracture) and/or low adhesive bond strength;

Score 3: Slight detachment of the film from the hot-melt adhesive film (up to 1 mm deep);

Score 4: Definite detachment of the film from the hot-melt adhesive film (up to 1 cm deep);

Score 5: Complete detachment of the film from the hot-melt adhesive film.

I. Substances Used

The following substances were used:

| Substance | Description |
|---|---|
| Polypropylene copolymer 1 | C3/C2/C4 copolymer (melt viscosity at 200° C.: 4,950,000 mPa · s) |
| Polypropylene copolymer 2 | Semicrystalline C3/C2 copolymer (melt viscosity at 200° C.: 2,700,000 mPa · s |
| Sabic 578 N | Polypropylene homopolymer, Sabic |
| Borseal RE909CF | C3/C2 copolymer, Borealis |
| Borseal RE239CF | C3/C2 copolymer, Borealis |
| Vistamaxx 6202 | C3/C2 copolymer, Exxon |
| Escorene UL 05540 | EVA, ethylene-vinyl acetate copolymer, Exxon |
| Vestoplast 750 | APAO, ethylene-propylene-butylene terpolymer, Evonik |
| Vestoplast 703 | APAO, ethylene-propylene-butylene terpolymer, Evonik |
| Licocene PP 2602 | C3/C2 polypropylene copolymer, Clariant |
| Escorez 5400 | Hydrogenated polycyclopentadiene resin; tackifying resin; Exxon |
| Epolene E 43 | Modified polypropylene wax, Westlake Chemical Corporation |
| Novares TN 150 | Aromatic hydrocarbon resin; tackifying resin; Rütgers Novares GmbH |
| Sylvares TP 2040 HME | Terpene-phenol resin, tackifying resin, Arizona Chemical |

-continued

| Substance | Description |
|---|---|
| Sasolwax H1 | Fischer-Tropsch wax, Sasol |
| Irganox 1010 | Antioxidant; BASF SE |

II. Thermomechanical Degradation a) Thermomechanical Degradation of a Mixture of Two Polypropylene Copolymers Trigonox 301 (peroxide as radical former) was added to a mixture of 70 wt % of a polypropylene copolymer 1 and 30 wt % of a polypropylene copolymer 2, in a quantity of 1.2 wt % based on the total quantity of the polymers. The resulting mixture was exposed, in a double-screw extruder (ZSK 25/40D; Werner & Pfleiderer), to a temperature of 220° C. under shear stress, with the result that a mixture of two thermomechanically degraded polypropylene copolymers (TDCoP) was obtained; the mixture had a melt viscosity (200° C.) of 18,300 mPa·s.

b) Producing Sabic 578 N/deg

Trigonox 301 (peroxide as radical former) was added to Sabic 578N, in a quantity of 0.26 wt % based on the total quantity of the polymer. The resulting mixture was exposed, in a double-screw extruder (ZSK 25/40D; Werner & Pfleiderer), to a temperature of 280° C. under shear stress at a rotation speed of 500 rpm, with the result that thermomechanically degraded Sabic 578 N (Sabic 578 N/deg) was obtained, having a melt viscosity (200° C.) of 17,400 mPa·s.

c) Producing Borseal RE909CF/deg

Trigonox 301 (peroxide as radical former) was added to Borseal RE909CF, in a quantity of 0.34 wt % based on the total quantity of the polymer. The resulting mixture was exposed, in a double-screw extruder (ZSK 25/40D; Werner & Pfleiderer), to a temperature of 282° C. under shear stress at a rotation speed of 500 rpm, with the result that thermomechanically degraded Borseal RE909CF (Borseal RE909CF/deg) was obtained, having a melt viscosity (200° C.) of 15,300 mPa·s.

d) Producing Borseal RE239CF/deg

Trigonox 301 (peroxide as radical former) was added to Borseal RE239CF, in a quantity of 0.37 wt % based on the total quantity of the polymer. The resulting mixture was exposed, in a double-screw extruder (ZSK 25/40D; Werner & Pfleiderer), to a temperature of 280° C. under shear stress at a rotation speed of 500 rpm, with the result that thermomechanically degraded Borseal RE239CF (Borseal RE239CF/deg) was obtained, having a melt viscosity (200° C.) of 15,300 mPa·s.

e) Producing Vistamaxx 6202/deg

Trigonox 301 (peroxide as radical former) was added to Vistamaxx 6202, in a quantity of 0.35 wt % based on the total quantity of the polymer. The resulting mixture was exposed, in a double-screw extruder (ZSK 25/40D; Werner & Pfleiderer), to a temperature of 280° C. under shear stress at a rotation speed of 500 rpm, with the result that thermomechanically degraded Vistamaxx 6202 (Vistamaxx 6202/deg) was obtained, having a melt viscosity (200° C.) of 18,500 mPa·s.

III. Production and Properties of Hot-Melt Adhesives

The substances indicated below were each mixed in a suitable apparatus so that a hot-melt adhesive was obtained in each case. The percentage quantitative indications refer in each case to the total quantity of the hot-melt adhesive.

Example 1

Hot-Melt Adhesive of the Present Invention Based on TDCoP

| Substance | Formulation (wt %) | Hardness (Shore D) | Thermal stability (° C.) | Melt viscosity (Pa · s) | Adhesion |
|---|---|---|---|---|---|
| TDCoP | 66.5 | 55 | 120 | 9.5 | (1-2) |
| Escorez 5400 | 28 | | | | |
| Epolene E 43 | 5.0 | | | | |
| Irganox 1010 | 0.5 | | | | |

Example 2

Hot-Melt Adhesive of the Present Invention Based on Borseal RE239CF/Deg and Vistamaxx 6202/Deg

| Substance | Enthalpy of fusion (J/g) | Formulation (wt %) | Hardness (Shore D) | Thermal stability (° C.) | Melt viscosity (Pa · s) | Adhesion |
|---|---|---|---|---|---|---|
| Borseal RE239CF/deg | 61 | 46.6 | 51 | 125° C. | 8.3 | (2) |
| Vistamaxx 6202/deg | 33 | 19.9 | | | | |
| Escorez 5400 | | 28 | | | | |
| Epolene E 43 | | 5.0 | | | | |
| Irganox 1010 | | 0.5 | | | | |

Example 3

Hot-Melt Adhesive of the Present Invention Based on Borseal RE909CF/Deg

| Substance | Formulation (wt %) | Hardness (Shore D) | Thermal stability (° C.) | Melt viscosity (Pa · s) | Adhesion |
|---|---|---|---|---|---|
| Borseal RE909CF/deg | 66.5 | 62 | 120° C. | 7.3 | (1-2) |

-continued

| Substance | Formulation (wt %) | Hardness (Shore D) | Thermal stability (° C.) | Melt viscosity (Pa · s) | Adhesion |
|---|---|---|---|---|---|
| Escorez 5400 | 28 | | | | |
| Epolene E 43 | 5.0 | | | | |
| Irganox 1010 | 0.5 | | | | |

Comparative Example 1

Hot-Melt Adhesive Based on a Degraded Polypropylene Homopolymer

| Substance | Formulation (wt %) | Hardness (Shore D) | Thermal stability (° C.) | Melt viscosity (Pa · s) | Adhesion |
|---|---|---|---|---|---|
| Sabic 578 N/deg | 66.5 | 78 | 155° C. | 4.8 | (5) |
| Escorez 5400 | 28 | | | | |
| Epolene E 43 | 5.0 | | | | |
| Irganox 1010 | 0.5 | | | | |

Comparative Example 2

EVA-Based Hot-Melt Adhesive

| Substance | Formulation (wt %) | Hardness (Shore D) | Thermal stability (° C.) | Melt viscosity (Pa · s) |
|---|---|---|---|---|
| Novares TN 150 | 50 | 50 | 75 | 3.0 |
| Sylvares TP 2040 HME | 10 | | | |
| Escorene UL 05540 | 30 | | | |
| Sasolwax H1 | 10 | | | |
| Irganox 1010 | 0.1 | | | |

Comparative Example 3

APAO-Based Hot-Melt Adhesive

| Substance | Formulation (wt %) | Hardness (Shore D) | Thermal stability (° C.) | Melt viscosity (Pa · s) |
|---|---|---|---|---|
| Vestoplast 750 | 34.0 | 28 | 100 | 9 |
| Vestoplast 703 | 34.0 | | | |
| Escorez 5300 | 26.5 | | | |
| Irganox 1010 | 0.5 | | | |
| Epolene E 43 | 5.0 | | | |

Comparative Example 4

Hot-Melt Adhesive Based on (Undegraded) C3/C2 Polypropylene Copolymer

| Substance | Formulation (wt %) | Hardness (Shore D) | Thermal stability (° C.) | Melt viscosity (Pa · s) |
|---|---|---|---|---|
| Licocene PP 2602 | 69.5 | 37 | 60 | 1 |
| Escorez 5400 | 30.0 | | | |
| Irganox 1010 | 0.5 | | | |

Examples 1 and 2 show that effective adhesive bonding of a decorative film on a particle-board surface was achieved with hot-melt adhesives that contain mixtures of two thermomechanically decomposed polypropylene copolymers. The hot-melt adhesives were furthermore notable for a high Shore D hardness and very good thermal stability.

The hot-melt adhesive disclosed in Example 3, which encompasses only one thermomechanically degraded polypropylene copolymer, also exhibited high hardness and good bonding properties when bonding a decorative finish film having a film weight of 40 g/m². When bonding comparable decorative finish films with a higher film weight of 90 g/m², however, the aforesaid hot-melt adhesive was inferior in terms of its adhesion strength to the hot-melt adhesives of Examples 1 and 2.

It is evident from a comparison between Example 3 and the Comparative example 1 that hot-melt adhesives having good bonding properties were obtained only with the use of thermomechanically degraded polypropylene copolymers, while the adhesive strength of hot-melt adhesives based on polypropylene homopolymers was insufficient.

EVA-based hot-melt adhesives (Comparative example 2) exhibited insufficient thermal stability (<100° C.), while APAO-based hot-melt adhesives (Comparative example 3) exhibited insufficient Shore D hardness.

Commercially obtainable low-molecular-weight C3/C2 polypropylene copolymers (Comparative example 4) were likewise unsuitable for the intended use according to the present invention, since their Shore D hardness and thermal stability were too low.

The invention claimed is:
1. A hot-melt adhesive comprising:
   (A) 10 to 80 wt % of at least one thermomechanically degraded polypropylene copolymer,
   (B) 5 to 60 wt % of at least one tackifying resin,
   (C) 0 to 40 wt % of at least one further additive,
       wherein the hot-melt adhesive has a Shore D hardness above 50 measured in accordance with DIN EN ISO 868:2003;
       wherein the components (A), (B) and (C) totals to 100 wt % of the hot-melt adhesive; and
       wherein the adhesive is adapted for bonding a film/foil selected from a metal film, metal foil, paper film, paper foil, plastic film or plastic foil.
2. The hot-melt adhesive according to claim 1, wherein the thermomechanically degraded polypropylene copolymer is manufactured by thermomechanical degradation of at least one polypropylene copolymer under shear stress above the softening point of the polypropylene copolymer,
       wherein the melt viscosity of the thermomechanically degraded polypropylene copolymer is less than 70% of the melt viscosity of the undegraded polypropylene copolymer, determined at 200° C.

3. The hot-melt adhesive according to claim 2, wherein the thermomechanical degradation is carried out in the presence of at least one radical former.

4. The hot-melt adhesive according to claim 1, wherein the thermomechanically degraded polypropylene copolymer has a propylene content of 50 to 99 wt %, based on the total weight of the thermomechanically degraded polypropylene copolymer.

5. The hot-melt adhesive according to claim 1, wherein the thermomechanically degraded polypropylene copolymer has an ethylene content of 1 to 25 wt %, based on of the total weight of the thermomechanically degraded polypropylene copolymer.

6. The hot-melt adhesive according to claim 1, wherein the thermomechanically degraded polypropylene copolymer has a melt viscosity, determined at 200° C., of 100 mPa·s to 200,000 mPa·s.

7. The hot-melt adhesive according to claim 1, wherein the softening point of the thermomechanically degraded polypropylene copolymer is between 80° C. and 170° C., measured in accordance with ASTM E-28.

8. The hot-melt adhesive according to claim 1, wherein the glass transition temperature (Tg) of the thermomechanically degraded polypropylene copolymer is less than 0° C.

9. The hot-melt adhesive according to claim 1 comprising at least two different thermomechanically degraded polypropylene copolymers, wherein the first thermomechanically degraded polypropylene copolymer has an enthalpy of fusion of 1 J/g to 50 J/g, and the second thermomechanically degraded polypropylene copolymer has an enthalpy of fusion from 55 J/g to 120 J/g, measured in accordance with DIN EN ISO 11357-3.

10. The hot-melt adhesive according to claim 1, wherein the hot-melt adhesive is substantially free of fillers.

11. An article comprising at least one adhesive layer of a hot-melt adhesive on a film/foil selected from a metal film, metal foil, paper film, paper foil, plastic film or plastic foil, wherein the hot-melt adhesive comprises:
 (A) 10 to 80 wt % of at least one thermomechanically degraded polypropylene copolymer,
 (B) 5 to 60 wt % of at least one tackifying resin,
 (C) 0 to 40 wt % of at least one further additive,
 and the hot-melt adhesive has a Shore D hardness above 50 measured in accordance with DIN EN ISO 868:2003.

12. The article according to claim 11, wherein the adhesive layer is heat-activatable.

13. The article according to claim 11, wherein the adhesive layer has a thickness of 10 µm to 100 µm.

14. The article according to claim 11, wherein the film/foil is an imprinted single- or multi-layer.

15. A method for adhesively bonding a film/foil onto a substrate, comprising the steps of:
 (A) applying a hot-melt adhesive, having a Shore D hardness above 50 measured in accordance with DIN EN ISO 868:2003, onto one surface of the film/foil to form a coated film/foil;
 (B) activating the coated film/foil;
 (C) bringing together the coated film/foil and a substrate; and then
 (D) bonding the coated film/foil to the substrate with simultaneous application of pressure and temperature;
  wherein the hot-melt adhesive comprises (1) 10 to 80 wt % of at least one thermomechanically degraded polypropylene copolymer, (2) 5 to 60 wt % of at least one tackifying resin, and (3) 0 to 40 wt % of further additives; and
  wherein the film/foil selected from a metal film, metal foil, paper film, paper foil, plastic film or plastic foil.

16. The method according to claim 15, wherein the bonding is carried out by compression with a roller.

17. The method according to claim 15, wherein the coated film/foil is heated to 120 to 150° C. in step (B).

18. The method according to claim 17, wherein the coated film/foil is heated to a temperature below the softening point of the hot-melt adhesive in step (B).

19. The method according to claim 18, wherein the coated film/foil is heated by radiative heat and/or by means of a heated roller.

20. The method according to claim 15, wherein the substrate is selected from shaped elements made of wood, metal or plastic.

21. A hot-melt adhesive comprising:
 (A) 61 to 80 wt % of at least one thermomechanically degraded polypropylene copolymer,
 (B) 5 to 60 wt % of at least one tackifying resin,
 (C) 0 to 40 wt % of at least one further additive,
  wherein the hot-melt adhesive has a Shore D hardness above 50 measured in accordance with DIN EN ISO 868:2003;
  wherein the components (A), (B) and (C) totals to 100 wt % of the hot-melt adhesive; and
  wherein the adhesive is adapted for bonding a film/foil selected from a metal film, metal foil, paper film, paper foil, plastic film or plastic foil.

22. The hot-melt adhesive according to claim 21 comprising at least two different thermomechanically degraded polypropylene copolymers,
 wherein the first thermomechanically degraded polypropylene copolymer has an enthalpy of fusion of 1 J/g to 50 J/g, and the second thermomechanically degraded polypropylene copolymer has an enthalpy of fusion from 55 J/g to 120 J/g, measured in accordance with DIN EN ISO 11357-3.

* * * * *